Aug. 14, 1951 R. E. LILLIG 2,564,015
COIN-CONTROLLED LIQUID DISPENSING APPARATUS
Filed May 18, 1946
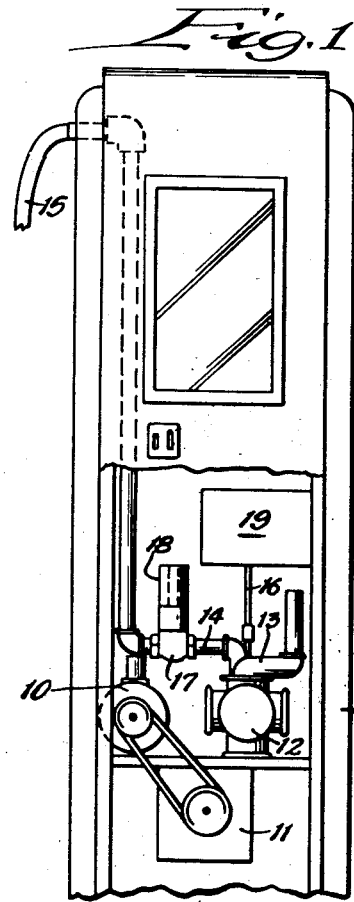
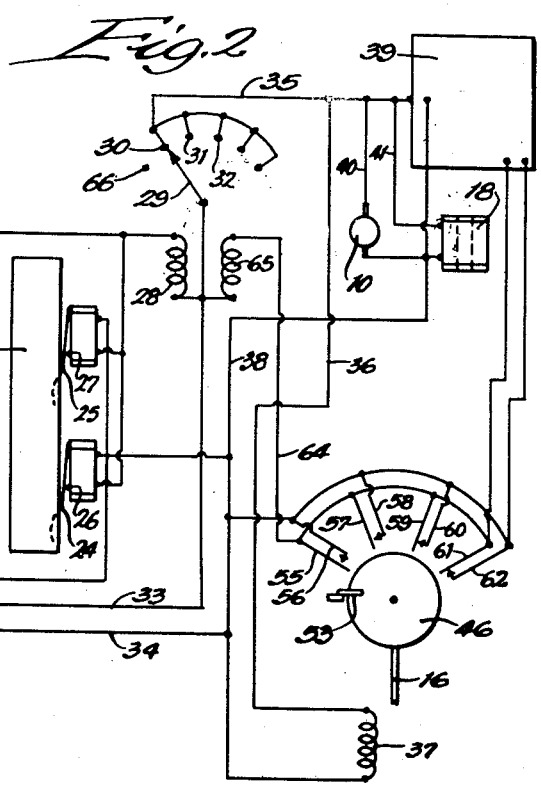
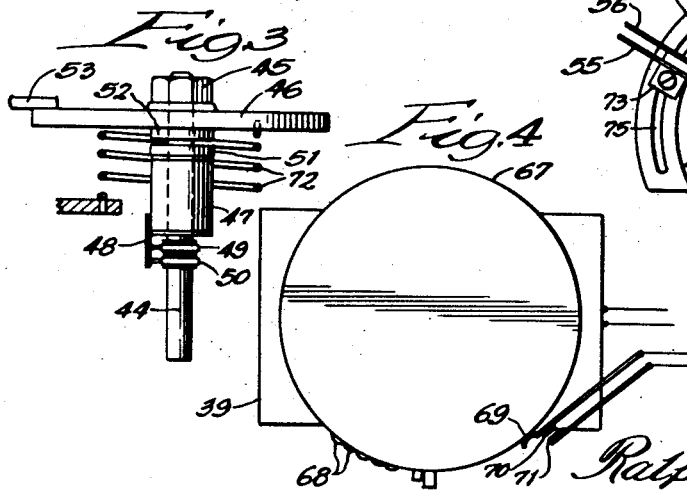
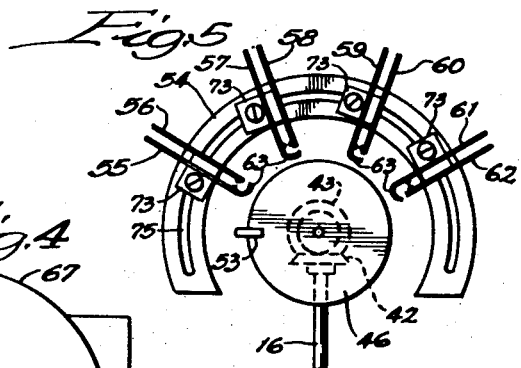
Inventor:
Ralph E. Lillig,
By Dawson, Orth and Hangauer,
Attorneys.

Patented Aug. 14, 1951

2,564,015

UNITED STATES PATENT OFFICE 2,564,015

COIN-CONTROLLED LIQUID DISPENSING APPARATUS

Ralph E. Lillig, Chicago, Ill.

Application May 18, 1946, Serial No. 670,822

2 Claims. (Cl. 222—2)

This invention relates to coin controlled liquid dispensing apparatus. The invention is particularly useful in the dispensing of gasoline and similar fluids.

An object of the invention is to provide an extremely simple and compact control device which may be incorporated with existing gasoline dispensing mechanism and the like for automatically controlling the amount of gasoline dispensed and through the means of inserting coins, etc. A further object is to provide a unit of simple and compact structure which may be installed in a gasoline dispensing structure or the like for automatically controlling the amount of gasoline dispensed through the insertion of coins and for limiting the period of operation of the mechanism. Yet another object is to provide means for closing the operation of the machine after a predetermined period of time and where the user of the machine has taken only a portion of the gasoline to which he is entitled. A further object is to provide liquid dispensing mechanism of compact and simple structure in which coins of one or more denominations may be inserted for automatically producing a measured amount of gasoline or other fluid in a dispensing tube or nozzle. Other specific objects and advantages will appear as the specification proceeds.

The invention is illustrated, in a preferred embodiment, by the accompanying drawing, in which—

Figure 1 is a broken vertical view in elevation of structure embodying my invention, a portion of the casing of the apparatus being removed to show the structure inside; Fig. 2, a plan diagram of a wiring layout illustrating the invention; Fig. 3, a broken side view in elevation of the metering control plate; Fig. 4, a front view in elevation of a timer plate; and, Fig. 5, a front view in elevation of the metering plate supported in operative position with respect to control switches.

In the illustration given, A designates the casing of the usual gasoline dispensing pump or apparatus now in common use. Within the casing is supported a motor 10 which drives by means of a pulley, a pump 11 communicating with the storage tank of gasoline. The pump 11 discharges gasoline through a metering and recirculating device 12 of well known construction and equipped with a vent 13. From the metering device 12 extends an outlet pipe 14 which extends upwardly through the casing and connects with a flexible outlet hose 15 equipped with the usual dispensing nozzle (not shown). The metering device 12 drives a shaft 16 of well known construction and which is commonly in use for actuating an indicator means showing the amount of gasoline being dispensed.

All of the structure described above is of well known construction and is illustrated in U. S. Patent No. 2,223,146. A further detailed description is believed unnecessary.

In carrying out the present invention, I equip the outlet pipe 14 with a valve 17 which is controlled by a solenoid 18. Normally, the valve 17 is closed but when solenoid 18 is energized, the valve is actuated to open the outlet pipe 14.

Within the casing A, I prefer to insert a unit 19 which will serve as automatic control mechanism for the operation of the machine. The contents of the unit 19 are illustrated in Figs. 2 to 5, inclusive, and in operative relation with the pump mechanism, etc., already described.

The unit 19 is provided with a coin slot 20 adapted to receive one denomination of coin and a second coin slot 21 adapted to receive a larger denomination of coin. The coin in falling to the bottom of the slot 20 actuates a finger 22 which closes the contact 23. Similarly, coins dropped into the slot 21 actuate the fingers 24 and 25 and move them against the contacts 26 and 27. The closing of the contacts indicated actuates the solenoid 28 in an addition mechanism illustrated by the arm 29 and the arm 29 swings to make the contacts 30, 31 and 32, etc. The movement of the arm 29 is in response to the number or denomination of coins inserted and moves successively along the contacts 30, 31 and 32, etc., according to the amount of money thus inserted into the slots. Arm 29 by engagement with any of the contacts 30, 31 and 32, etc., closes the circuit formed by the lines 33 and 34 connected to any suitable source of current. Current flowing through line 33, arm 29 and contact 30 now flows through line 35, line 36 to a clutch solenoid 37 and thence backwardly through line 38 to an electric timer device 39. Current also flows through line 40, motor 10, valve solenoid 18 and back through line 41.

The deposit of coins, therefore, sets in operation the motor 10 which starts the pump 11 into operation and also the metering device 12 which rotates shaft 16. At the same time, solenoid 18 is actuated which opens valve 17. Thus the pump starts supplying gasoline through the outlet pipe 14.

I next wish to describe mechanism driven by the metering shaft 16 for stopping the pumping operation after a pre-determined amount of gasoline has been dispensed. The shaft 16 is equipped at one end with bevel gears 42 which drive bevel gears 43 fixed to shaft 44. The upper end of shaft 44 is provided with a nut 45 and upon the shaft 44 is freely mounted a metering control plate 46. At the rear of plate 46, I provide a magnetic clutch for releasably connecting the freely mounted control disc 46 to the driven shaft 44, as shown more clearly in Fig. 3. Mounted about the shaft 44 is an electromagnet or coil 47. The coil is energized by the brush 48 engaging circular brushes 49 and 50 carried by the rotating shaft 44. Upon the energizing of the coil or magnet 47, the ring 51 which is splined to shaft 44 is repelled by the magnet and forced against the depending collar 52 of the plate 46, the latter operation serving to lock the ring 51 to the plate 46 and thus to the rotating shaft 44. It will be understood that any suitable magnetic device may be employed for releasably locking the plate 46 to the rotating shaft 44.

The metering control plate 46 may be provided with a projecting finger 53 adapted to make the contacts which will now be described. Adjustably mounted upon a semicircular frame 54 are the contact arms 55 and 56, 57 and 58, 59 and 60, and 61 and 62. Arms 55, 57, 59 and 61 are provided at their forward ends with a curved cam surface 63 which, when engaged by the finger 53 of plate 46, produces a contact between the arm and the adjacent arm. A contact between arms 55 and 56 closes a circuit in which lead 64 connects with the subtracting solenoid 65. The actuation of the solenoid 65 thus causes the arm 29 to be swung one space to the left and finally to the point 66 at which the circuit is open. Similarly, the closing of the contacts between arms 57 and 58 causes the arm 29 to swing one step to the left. The same result is achieved by the closing of contacts between arms 59 and 60. It will be understood that any number of contact arms corresponding to the pairs 55 and 56, 57 and 58, and 59 and 60 may be employed.

It will be understood that when the gasoline case is empty or if the apparatus is inoperative for any other reason, a red light or other warning signal may be employed for indicating that the device is not to be operated.

In the ordinary operation of the pump mechanism, when the valve controlled nozzle through which the gasoline is being introduced into the automobile tank is closed, the pump mechanism continues in operation but the gasoline is recirculated through the mechanism and back to the pump gasoline tank. There is a possibility that the user after depositing coins, will sometimes find that the car tank will not hold all of the gasoline purchased or, for any other reason, will decide to withdraw only a portion of the gasoline purchased. Closure of the nozzle valve, however, permits the pump mechanism and other mechanism within the tank A to continue in operation. To meet this situation, I provide timing mechanism which is set into operation upon the deposit of coins and which, after the lapsing of a pre-determined period of time, as for example, 10 minutes, will automatically close off the operation of the device and reset the parts for the next operation.

The time control device 39 may be of any suitable form or construction. In the illustration, I provide a rotatably driven plate 67 which is driven by electrically operating timing mechanism, and after the lapse of 10 minutes or some other pre-determined period of time, will bring cams 68 into engagement with the contact finger 69 to close the contacts 70 and 71. The bringing together of contacts 70 and 71 actuates the subtraction solenoid 65 to move the lever 29 one space to the left. There are a series of cams 68 and each of the cams serves to close the contacts 70 and 71 and this brings about successive movements of the arm 29 to the left until finally arm 29 swings to point 66 and thus breaks the main circuit.

When the main circuit is broken, the clutch solenoid 37 forming the magnet 47 releases the plate 46 and the plate 46 under the influence of torsion spring 72 swings back to its original position, as indicated in Fig. 2. At the same time, the valve solenoid 18 is deenergized and allows the valve 17 to close. The pump motor 10 ceases to operate. The timing mechanism 39 assumes its original position. The apparatus is thus ready to function again upon the dropping of coins in the slots 20 and 21.

Operation

In the operation of the device, the user of the apparatus deposits a coin in slot 20 or slot 21 or coins in both of the slots. The closure of any of the contacts results in the energizing of the addition solenoid 28 which moves the contact arm 29 a given distance in proportion to the amount of coins deposited. Let us assume that the arm 29 is swung in contact with the points 30 and then 31 and finally into contact with point 32. The circuit being completed by the movement of arm 29 from the point 66 to the other points indicated, motor 10 starts into operation and drives the pump 11. At the same time, solenoid 18 opens the valve 17 in outlet pipe 14 and gasoline is dispensed through the hose 15. At the same time, the magnetic clutch 47 is energized through the actuation of the coil 37 and the splined ring 51 is moved into contact with the collar 52 of plate 46, thus connecting the metering control plate 46 with the shaft 47 and thereby with driven shaft 16. Rotation of shaft 46 moves the finger 53 successively into contact with the pairs of arms carried on frame 54. When the finger 53 joins arms 55 and 56, the subtraction solenoid 65 is actuated to swing arm 29 to the left for one space. Similarly, arm 29 is swung to the left again when the finger 53 moves the contacts of arms 57 and 58 together. A similar operation occurs when the finger 53 engages the cam 63 of arm 59, and finally the arm 29 swings away from contact 30 and to the starting point 66, thus opening the entire circuit and stopping operation of all of the parts.

To accommodate price changes so that the amount of gasoline dispensed for each coin will be larger or smaller according to the existing prices, the arms 55 and 56, 57 and 58, etc. have been described as being adjustably mounted upon the bracket member 54. Each pair of arms is preferably carried by a block 73 which may be adjustably clamped in position by means of the bolt 74 extending through the slot 75 of bracket 54. If desired, the arcuate bracket 54 may be calibrated or provided with graduated markings to facilitate the setting of the blocks 73 in making the necessary adjustments for price changes.

The timing device operates, as has already been described, for a pre-determined time after the circuit is closed and then brings the cams 68 successively into contact with the finger 69 so as to repeatedly actuate the subtraction solenoid 65 and thus to bring the arm 29 to the circuit breaking position at 66. In this position, the motor ceases to operate, the solenoid 18 ceases to maintain the valve 17 open and the metering plate 46 swings to its initial position shown in Fig. 2, under the influence of spring 72 and after the release of the magnetic clutch. Similarly, the timer plate 67, which may likewise be provided with a magnetic clutch and torsion spring similar to the structure already described and illustrated in Fig. 3, will return to its initial starting position.

The timing device is set into operation concurrently with the meter-actuated device, but operates much more slowly. The spaced cams 28 on the plate 67 do not become effective for actuating the contact 69 until long after the meter-actuated device has operated. Thus, after the metering device has normally stopped, the timing mechanism continues in operation, finally bringing the cams 68 successively into contact with the finger 69 to bring the arm 29 to the circuit-breaking position at 66. Thus, if the purchaser of gasoline has dropped into the machine too many coins and does not wait to obtain his full amount of gasoline, the timing mechanism will continue in operation after the purchaser has left and will after the predetermined time break the circuit and bring the timer plate back to its initial position. Plate 46 will have already returned to its initial position.

It will be understood that a number of modifications may be required in order to adapt the apparatus herein described to a currently used electric pump or gasoline dispensing apparatus, but such connections are readily within the skill of those familiar with this art. For example, the shaft 16 driven by the metering mechanism may be extended by any suitable connections to the indicator apparatus normally employed with the pump for actuating such indicator apparatus in the usual manner.

While in the foregoing description, I have set forth a single embodiment and details with respect to the construction and operation thereof, it will be understood that such details may be varied widely by those skilled in the art without departing from the spirit of my invention.

I claim:

1. In combination with liquid dispensing apparatus having a pump and outlet pipe therefor, a motor driving said pump, metering mechanism associated with said pump and including a shaft driven by said metering mechanism, a solenoid-controlled valve in said outlet pipe, a plate adapted to be driven by said shaft, a solenoid-operated clutch for securing said plate to said shaft, coin-controlled mechanism for closing the circuit of said motor and solenoids, contact breakers actuated by said plate after a predetermined rotation thereof for opening the circuit of said motor and solenoids, electrically-operated timing mechanisms, a plate driven thereby equipped with spaced cams, and a contact breaker actuated by said cams for closing the circuit of said motor and solenoids normally after the operation of said coin-controlled mechanism.

2. In combination with liquid dispensing apparatus having a pump and outlet pipe therefor, a motor driving said pump, metering mechanism associated with said pump and including a shaft driven by said metering mechanism, a solenoid-controlled valve in said outlet pipe, a circular plate adapted to be driven by said shaft, a solenoid-operated clutch for securing said plate to said shaft, coin-controlled mechanism for closing the circuit of said motor and solenoids, contact breakers actuated by said plate after a predetermined rotation thereof for opening the circuit of said motor and solenoids, electrically-operated timing mechanism, a rotatably mounted plate driven thereby and equipped with spaced cams, and a contact breaker actuated by said cams for closing the circuit of said motor and solenoids normally after the operation of said coin-controlled mechanism.

RALPH E. LILLIG.

REFERENCES CITED

The following references are of record in the file of this patent:

UNITED STATES PATENTS

| Number | Name | Date |
| --- | --- | --- |
| 1,607,899 | Long | Nov. 23, 1926 |
| 1,866,523 | Alexander | July 12, 1932 |
| 2,223,146 | Yeomans | Nov. 26, 1940 |
| 2,247,480 | Damon et al. | July 1, 1941 |
| 2,384,585 | Alexander | Sept. 11, 1945 |